(12) United States Patent
Tamura

(10) Patent No.: US 7,206,144 B2
(45) Date of Patent: Apr. 17, 2007

(54) IMAGING LENS AND IMAGING APPARATUS

(75) Inventor: Masaki Tamura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/205,126

(22) Filed: Aug. 17, 2005

(65) Prior Publication Data

US 2006/0056073 A1    Mar. 16, 2006

(30) Foreign Application Priority Data

Aug. 26, 2004   (JP) ............................ 2004-246829

(51) Int. Cl.
  *G02B 9/04*   (2006.01)
  *G02B 9/08*   (2006.01)

(52) U.S. Cl. ................. 359/793; 359/794; 359/740

(58) Field of Classification Search ............ 359/794, 359/740, 793
See application file for complete search history.

(56) References Cited

U.S. PATENT DOCUMENTS 5,000,552 A * 3/1991 Simpson et al. ............ 359/740
5,067,803 A * 11/1991 Ohno ......................... 359/708
5,166,830 A * 11/1992 Ishibai et al. ................ 359/717
6,992,841 B2 * 1/2006 Saito et al. .................. 359/794

FOREIGN PATENT DOCUMENTS

JP    2003-215446    7/2003
JP    2004-004566    1/2004

* cited by examiner

*Primary Examiner*—Jordan M. Schwartz
(74) *Attorney, Agent, or Firm*—Rader Fishman & Grauer PLLC; Ronald P. Kananen

(57) ABSTRACT

An imaging lens system includes a first lens having a meniscus profile with a convex surface facing an object side and having a positive refractive index; an aperture diaphragm; and a second lens having a meniscus profile with a convex surface facing an image side and having a positive refractive index, wherein the first lens, the aperture diaphragm, and the second lens are arranged in this order from the object side. The imaging lens satisfies conditional expressions where f represents a focal distance of a total lens system, f1 represents a focal distance of the first lens, and L represents a distance on the optical axis from the surface on the object side of the first lens to an image plane wherein calculation is done in terms of an air-equivalent thickness for a back insertion glass, and n(ave) represents an average value of refractive indexes at d-lines of the first and second lenses.

12 Claims, 7 Drawing Sheets

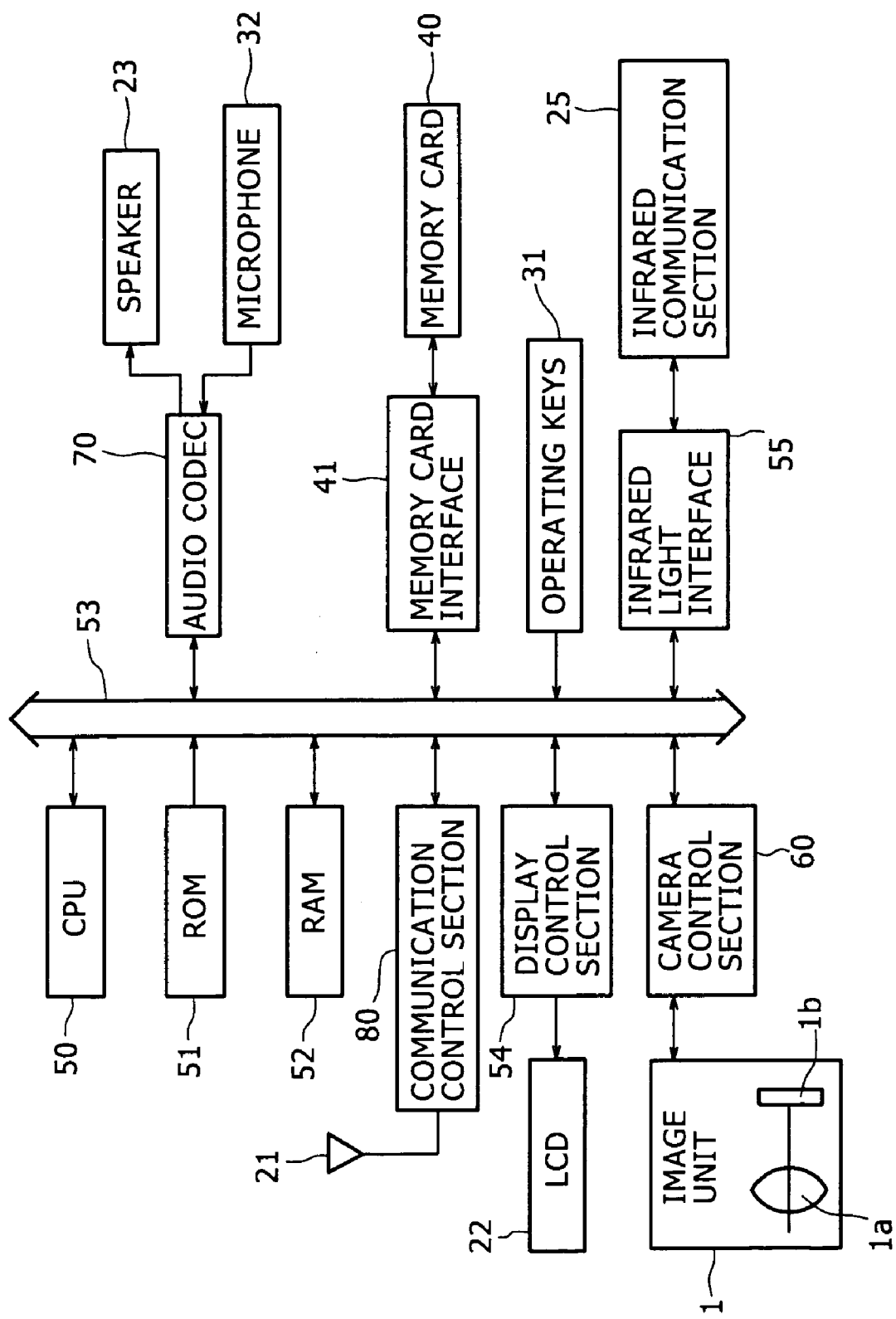

IMAGING LENS AND IMAGING APPARATUS

The present invention contains subject matter related to Japanese Patent Application JP 2004-246829 filed in the Japanese Patent Office on Aug. 26, 2004, the entire contents of which being incorporated herein by reference.

BACKGROUND OF THE INVENTION

1. Field of the Invention

The present invention relates to imaging lenses and imaging apparatuses. More specifically, the invention relates to an imaging lens suited for use in compact imaging apparatuses using a solid state imaging device, such as a charge coupled device (CCD) or complementary metal-oxide semiconductor (CMOS) and to an imaging apparatus using the lens.

2. Description of the Related Art

As apparatuses using a solid state imaging device, such as a CCD or CMOS, camera-enabled mobile phones, digital still cameras, and such other apparatuses are known. In the field of such imaging apparatuses, further size reduction or compactness is demanded, so that an imaging lens being mounted therein is required to have a reduced total length (total lens length).

Generally known imaging lenses being used for the above purposes include types of, for example, a doublet configuration and triplet configuration. For example, types as disclosed in Japanese Unexamined Patent Application Publication No. 2003-215446 and No. 2004-4566 are known.

In recent years, in the field of compact imaging apparatuses, such as camera-enabled mobile phones, technology is advanced for enhancement in compactness and high pixel density of imaging devices, and models with high pixel density imaging devices on mega-pixel or higher orders are marketed as popular apparatuses. Under these circumstances, a requirement for high lens performance corresponding to such high-pixel density solid state imaging devices is placed on an imaging lens being mounted.

In the case of the imaging lens disclosed in Japanese Unexamined Patent Application Publication No. 2003-215446, however, while doublet configuration and compactness are implemented, various types of substantial aberrations take place. In this case, the requirement for lens performance suitable to the high-pixel density imaging device cannot be satisfied. In the case of the imaging lens disclosed in Japanese Unexamined Patent Application Publication No. 2004-4566, although the lens has lens performance corresponding to a today's high-pixel density imaging device, the number of lenses is as large as three. In this case, physical constraints take place, thereby making it difficult to implement further compactness.

SUMMARY OF THE INVENTION

The present invention is made in view of the problems described above. Accordingly, it is desirous to provide a very compact imaging lens having high optical performance suitable to a high-pixel density imaging device while the imaging lens is configured of a few number of lenses or as few as two lenses. Further, it is desirous to provide an imaging apparatus using the imaging lens.

In order to solve the problems, an imaging lens according to an embodiment of the present invention includes a first lens having a meniscus profile with a convex surface facing an object side and having a positive refractive index; an aperture diaphragm; and a second lens having a meniscus profile with a convex surface facing an image side and having a positive refractive index, wherein the first lens, the aperture diaphragm, and the second lens are arrayed in the order from the object side. The imaging lens satisfies conditional expressions (1), (2), and (3):

$$0.2 < f/f1 < 1.0; \tag{1}$$

$$1.05 < L/f < 1.38; \text{ and} \tag{2}$$

$$n(ave) > 1.7, \tag{3}$$

where f represents a focal distance of a total lens system;

f1 represents a focal distance of the first lens; and

L represents a distance on the optical axis from the surface on the object side of the first lens to an image plane (calculation is done in terms of an air-equivalent thickness for a back insertion glass); and n(ave) represents an average value of refractive indexes at d-lines of two lenses, namely, the first and second lenses, constituting the lens system.

In addition, in order to solve the problems, an imaging apparatus lens of an embodiment of the present invention includes an imaging lens that includes a first lens having a meniscus profile with a convex surface facing an object side and having a positive refractive index, an aperture diaphragm, and a second lens having a meniscus profile with a convex surface facing an image side and having a positive refractive index, wherein the first lens, the aperture diaphragm, and the second lens are arrayed in the order from the object side; and an imaging device that converts into a signal an optical image formed by the imaging lens. The imaging lens satisfies conditional expressions (1), (2), and (3):

$$0.2 < f/f1 < 1.0; \tag{1}$$

$$1.05 < L/f < 1.38; \text{ and} \tag{2}$$

$$n(ave) > 1.7, \text{where} \tag{3}$$

f represents a focal distance of a total lens system;

f1 represents a focal distance of the first lens; and

L represents a distance on the optical axis from the surface on the object side of the first lens to an image plane (calculation is done in terms of an air-equivalent thickness for a back insertion glass); and n(ave) represents an average value of refractive indexes at d-lines of two lenses, namely, the first and second lenses, constituting the lens system.

According to the above, an imaging apparatus can be obtained that is very compact and has high optical performance suitable while the imaging lens is configured of a few number of lenses or as few as two lenses. In addition, with the imaging lens being used, a high-pixel density imaging device is used, thereby enabling high quality images to be obtained and enabling an imaging apparatus to be compactly configured.

In addition, the imaging lens according to the embodiment of the invention achieves the compactness, and concurrently, has a high lens performance with appropriately corrected aberrations of the total lens length. Further, since the aperture diaphragm is positioned between the first and second lenses, sensitivity is low for imperfect axial alignment between the first and second lenses, aligned assembly requiring an expensive, machine and time is not necessary, thereby enhancing mass-productivity. Further, with the imaging lens being used, a high-pixel density imaging device is used, thereby to enable high quality images to be obtained and to enable an imaging apparatus to be configured compactly.

Other embodiments of the imaging lens and imaging apparatus of the invention each satisfy (4) $0.05 \leq d1/f \leq 0.09$ and (5) $0.10 \leq d2/f \leq 0.18$, where f represents the focal distance of the total lens system, d1 represents a distance from a surface on the image side of the first lens to the aperture diaphragm, and d2 represents a distance from the aperture diaphragm to a surface on the object side of the second lens. Accordingly, further sufficient correction of aberrations becomes possible. In addition, the aperture diaphragm can be disposed in a desired position.

According to still other embodiments of the imaging lens and imaging apparatus of the invention, at least the surface on the object side of the first lens and the surface on the image side of the second lens are each formed into an aspheric surface profile. Accordingly, coma aberrations and distortion aberrations can be corrected further appropriately.

According to still other embodiments of the imaging lens and imaging apparatus of the invention, the surface on the object side of the first lens satisfies a conditional expression (6) $55°<|\theta1(h)|<80°$, where $\theta1(h)$ represents a tilt of the surface on the object side of the first lens at a height $h(=D1/2)$, D1 representing an effective diameter of the surface on the object side of the first lens. Accordingly, off-axis aberrations can be corrected with good balancing.

According to yet other embodiments of the imaging lens and imaging apparatus of the invention, the surface on the image side of the second lens satisfies a conditional expression (7) $55°<|\theta2(h)|<80°$, where $\theta2(h)$ represents a tilt of the surface on the image side of the second lens at the height $h(=D2/2)$, D2 representing an effective diameter of the surface on the image side of the second lens. Accordingly, off-axis aberrations can be corrected with good balancing.

BRIEF DESCRIPTION OF THE DRAWINGS

In the accompanying drawings:

FIG. 9 is a perspective view showing an exterior of the mobile phone in a folded state;

FIG. 11 is a block diagram of the mobile phone.

DETAILED DESCRIPTION OF THE PREFERRED EMBODIMENTS

Figure 1:
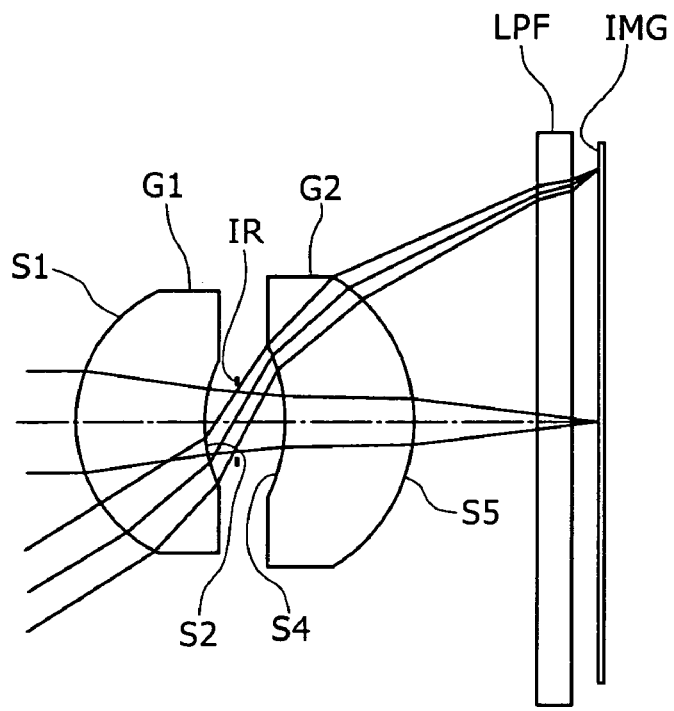
FIG. 1 is a view showing a lens configuration according to a first embodiment of the present invention.

Preferred embodiments of imaging lenses and imaging apparatuses according to the present invention will be described with reference to the accompanying drawings.

With reference to FIGS. 1, 3, 5, and 7, an imaging lens according to the present invention is configured of a first lens G1, a second lens G2, and an aperture diaphragm IR that are arrayed in that order from the object side. The first lens G1 has a meniscus profile with a convex surface facing an object side and has a positive index of refraction (or, "refractive index," hereafter), and the second lens G2 has a meniscus profile with a convex surface facing an image side and has a positive refractive index.

The configuration is made to be a very compact imaging lens having high optical performance suitable to a high-pixel density imaging device while the imaging lens is configured of a few number of lenses or as few as two lenses, wherein conditional expressions (1) to (3) below are satisfied:

$$0.2<f/f1<1.0; \tag{1}$$

$$1.05<L/f<1.38; \text{ and} \tag{2}$$

$$n(ave)>1.7, \tag{3}$$

where f: Focal distance of the system inclusive of all the lenses ("total lens system," hereafter);

f1: Focal distance of the first lens;

L: Distance on the optical axis from the surface on the object side of the first lens to the image plane (calculation is performed in terms of an air-equivalent thickness for a back insertion glass); and n(ave): Average value of refractive indexes at d-lines of the two lenses constituting the lens system.

The conditional expression (1) defines the ratio between the focal distance (f) of the total lens system and the focal distance (f1) of the first lens G1, thereby restricting the refractive index of the first lens G1. In the event the ratio is lower or equal to the lower limit value of the conditional expression (1), while it is advantageous for aberration correction, the total lens length of the total lens length is increased. This makes it impossible to implement the compactness. On the other hand, in the event the ratio is higher than or equal to the upper limit value of the conditional expression (1), it is difficult to effect correction of off-axis aberrations, particularly, correction of coma aberrations and image plane distortion aberrations.

The conditional expression (2) defines the ratio between the total length (L) of the lens system and the focal distance of the total lens system (f), thereby defining the balance between the size of the lens system and the amount of aberrations occurring in the lens system. In the event the ratio is lower or equal to the lower limit value of the conditional expression, while it is advantageous for compactness, the refractive index of the respective lens is increased. This makes it difficult to effect correction of off-axis aberrations, particularly, correction of coma aberrations and the image plane distortion aberrations. In addition, the above makes it difficult to secure a sufficient peripheral thickness of the respective lens, causing problems in forming processing. On the other hand, in the event the ratio is higher than or equal to the upper limit value of the conditional expression, while it is advantageous for aberration correction, the total lens length is increased. This makes impossible to implement the compactness.

The conditional expression (3) defines the average value of the refractive index at the d-line of the respective component lens, thereby restricting the refractive index of the lens being used. In the event the average value is lower or equal to the lower limit value of the conditional expression (3), the refractive index of the respective surface is deficient, so that the total lens length is increased. This makes it impossible to implement the compactness.

In addition, in the imaging lens according to the present invention, the aperture diaphragm IR is disposed between the first and second lenses G1 and G2, thereby enabling the provision of the imaging lens enhanced for high mass-productivity, low cost, and high performance. More specifically, the first and second lenses G1 and G2 are disposed substantially symmetrically, with the aperture diaphragm IR interposed therebetween. In this case, the sensitivity is low for imperfect axial alignment between the two lenses G1 and G2, so that aligned assembly requiring an expensive machine and time is not necessary, thereby enhancing mass-productivity.

Preferably, the imaging lens according to the present invention satisfies the following conditional expression:

$$0.05 \leq d1/f \leq 0.09; \text{ and} \qquad (4)$$

$$0.10 \leq d2/f \leq 0.18, \qquad (5)$$

where f: Focal distance of the total lens system;

d1: Distance from the surface on the image side of the first lens to the aperture diaphragm; and d2: Distance from the aperture diaphragm to the surface on the object side of the second lens.

The conditional expression (4) defines the ratio between the distance (d1) from the surface on the image side of the first lens G1 to the aperture diaphragm IR and the focal distance (f) of the total lens system. The conditional expression (5) defines the ratio between the distance (d2) from the aperture diaphragm IR to the surface on the object side of the second lens G2 and the focal distance (f) of the total lens system. Thereby, the position of the aperture diaphragm IR is defined. In the event the ratio is higher than the upper limit value of the respective conditional expression (4), (5), it is difficult to effect correction of off-axis aberrations, particularly, correction of image plane distortion aberrations. On the other hand, in the event that the ratio is lower than the lower limit values of the respective conditional expression (4), (5), it is physically difficult to dispose the diaphragm in a desired position in the state that the peripheral thickness of the lens is secured.

Further, in the imaging lens according to the present invention, the surface on the object side of the first lens G1 and the surface on the image side of the second lens G2 are each preferably formed into an aspheric surface profile. Thereby, coma aberrations and distortion aberrations can be appropriately corrected.

Further, the imaging lens preferably satisfies at least one of the following conditional expressions:

$$55° < |\theta1(h)| < 80°; \text{ and} \qquad (6)$$

$$55° < |\theta2(h)| < 80°, \qquad (7)$$

where

θ1(h): Tilt of the surface on the object side of the first lens at the height h(=D1/2), D1 representing an effective diameter of the surface on the object side of the first lens; and θ2(h): Tilt of the surface on the image side of the second lens at the height h(=D2/2), D2 representing an effective diameter of the surface on the image side of the second lens.

The conditional expression (6) defines the tilt of the surface on the object side of the first lens G1 at a ray outermost effective portion. The conditional expression (7) defines the tilt of the image side surface of the second lens G2 at a ray outermost effective portion. At least one of the conditional expressions (6) and (7) is satisfied, thereby to enable off-axis aberrations to be corrected with good balancing.

Embodiments of imaging lenses and numeric embodiments according to the present invention will be described herebelow with reference to FIGS. 1 to 8 and Tables 1 to 9.

Symbols being used in the numeric embodiments are represented as follows:

FNo: F number;

f: Focal distance of the total lens system;

2ω: Total diagonal view angle;

Si: ith surface (surface Si) (i=number) in the order from the object side;

Ri: Radius of curvature of the surface Si;

di: Inter-surface distance between the surface of the ith surface in the order from the object side and the i+1th surface;

ni: Refractive index at the d-line (wavelength: 587.6 nm) of the ith lens; and vi Abbe number at d-line (wavelength: 587.6 nm) of the ith lens.

In addition, the aspheric surface profile is defined by an equation (1) below.

$$X = \frac{\frac{H^2}{R}}{1+\sqrt{1-(1+K)\left(\frac{H}{R}\right)^2}} + AH^4 + BH^6 + CH^8 + DH^{10} + EH^{12} \qquad (1)$$

where

X: Depth of the aspheric surface;

H: Height from the optical axis;

R: Radius of curvature;

K: Conic constant; and

A, B, C, D, and E: Fourth, sixth, eighth, tenth, and twelfth aspheric surface coefficients, respectively.

First Embodiment

FIG. 1 is a view showing a lens configuration according to a first embodiment of the present invention. An imaging lens of the first embodiment is configured of a first lens G1, a second lens G2, and an aperture diaphragm IR that are arrayed in that order from the object side. The first lens G1 has a meniscus profile with a convex surface facing the object side and has a positive refractive index, and the second lens G2 has a meniscus profile with a convex surface facing the image side and has a positive refractive index. An "LPF" is a lowpass filter interposed between the second lens G2 and an imaging plane IMG.

Table 1 shows data of an optical system according to a numeric embodiment 1 in the case where practical numeric values are applied to the first embodiment.

TABLE 1

FNo = 4.0
f = 4.09
2ω = 62.72°

| Si | Ri | di | ni | υi |
|---|---|---|---|---|
| 1 | 1.529 (ASP) | 1.25 | 1.7680 | 49.2 |
| 2 | 1.648 (ASP) | 0.30 | | |
| 3 | Aperture | 0.48 | | |
| 4 | −3.242 (ASP) | 1.28 | 1.8147 | 37.0 |
| 5 | −2.130 (ASP) | 1.26 | | |
| 6 | ∞ | 0.30 | 1.5168 | 64.2 |
| 7 | ∞ | 0.30 | | |
| 8 | IMG | | | |

In the first embodiment, both surfaces s1 and s2 of the first lens G1 and both surfaces s4 and s5 of the second lens G2 are each formed into an aspheric surface profile. Table 2 shows fourth, sixth, eighth, tenth, and twelfth aspheric surface coefficients A, B, C, D, and E of the respective surfaces s1, s2, s4, and s5, together with conic constants in the numeric embodiment 1.

TABLE 2

| Si | K | A | B | C | D | E |
|---|---|---|---|---|---|---|
| 1 | 0.2555 | −2.979E−03 | −2.563E−03 | 8.018E−04 | −1.156E−03 | 4.500E−04 |
| 2 | 1.6477 | 5.608E−02 | −2.272E−01 | 1.183E+00 | −1.396E+00 | 7.827E−01 |
| 4 | 11.3433 | −5.564E−02 | 9.729E−03 | −1.632E−01 | 3.890E−01 | −3.579E−01 |
| 5 | 1.0701 | −3.859E−03 | −1.067E−02 | 4.658E−03− | −1.366E−03 | 6.991E−05 |

Figure 2:
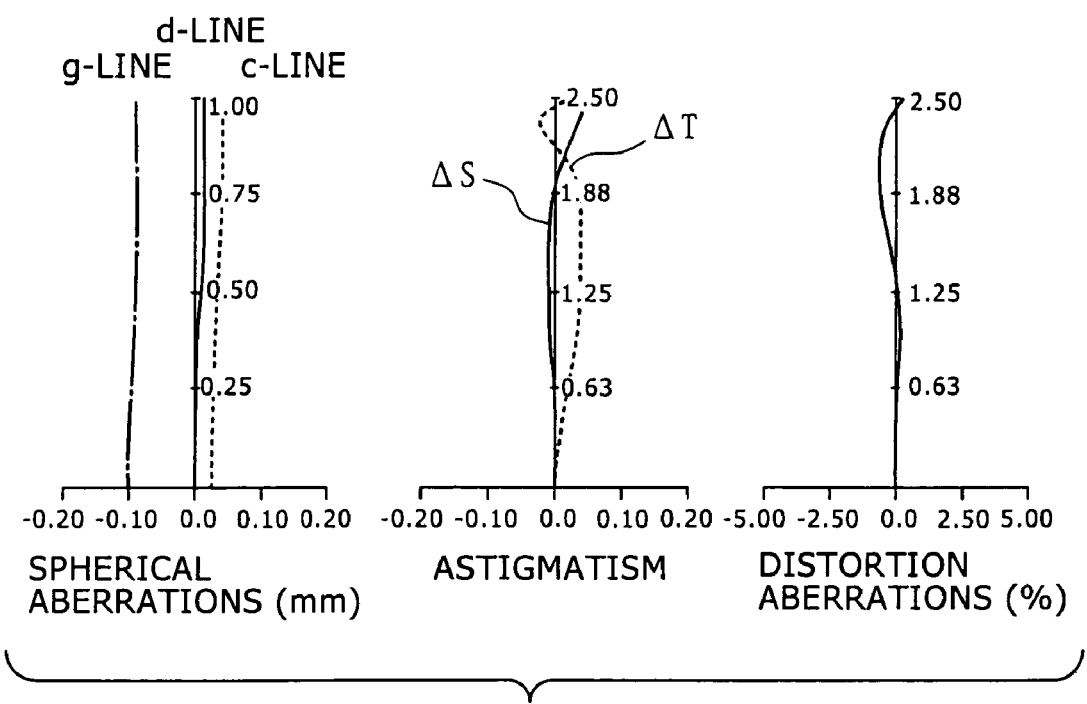
FIG. 2 shows diagrams of spherical aberrations, astigmatism, and distortion aberrations according to a numeric embodiment 1 wherein practical numeric values are applied to the first embodiment.

FIG. 2 shows diagrams of spherical aberrations, astigmatism, and distortion aberrations according to the numeric embodiment 1. In the diagrams of spherical aberrations, a solid line represents a spherical aberration at the d-line, a broken line represents a spherical aberration at the C-line, and a single-dotted chain line represents a spherical aberration at the g-line. In the diagram of astigmatism, a solid line shows a sagittal image plane, and a broken line a meridional image plane.

As can be seen from Table 1, according to the numeric embodiment 1, the total length is as short as 5.17 mm; and it can be known from FIG. 2 that the respective aberrations are appropriately corrected.

Second Embodiment

Figure 3:
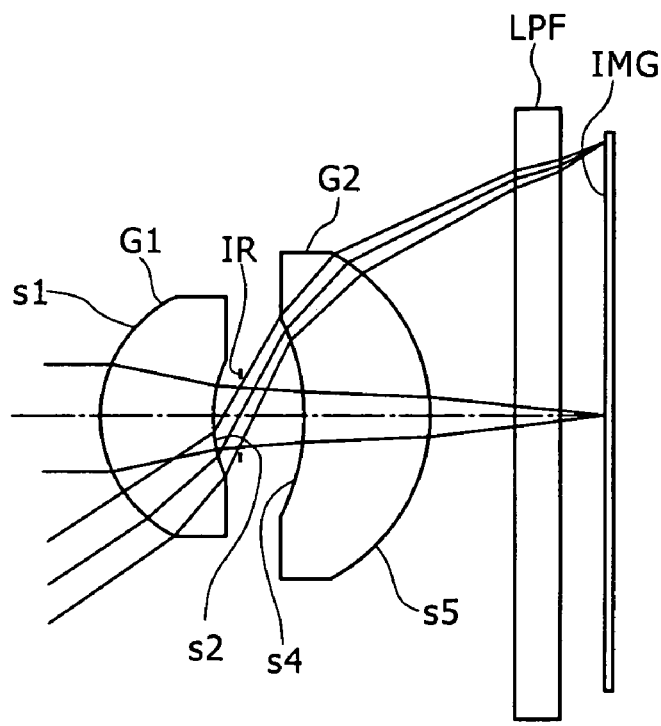
FIG. 3 is a view showing a lens configuration according to a second embodiment of the present invention.

FIG. 3 is a view of a lens configuration according to a second embodiment of the present invention. An imaging lens of the second embodiment is configured of a first lens G1, a second lens G2, and an aperture diaphragm IR that are arrayed in that order from the object side. The first lens G1 has a meniscus profile with a convex surface facing the object side and has a positive refractive index, and the second lens G2 has a meniscus profile with a convex surface facing the image side and has a positive refractive index. An "LPF" is a lowpass filter interposed between the second lens G2 and an imaging plane IMG.

Table 3 shows data of an optical system according to a numeric embodiment 2 in the case where practical numeric values are applied to the second embodiment.

TABLE 3

FNo = 4.0
f = 4.61
2ω = 65.03°

| Si | Ri | di | ni | υi |
|---|---|---|---|---|
| 1 | 1.444 (ASP) | 1.21 | 1.7433 | 49.3 |
| 2 | 1.460 (ASP) | 0.30 | | |
| 3 | Aperture | 0.70 | | |
| 4 | −4.035 (ASP) | 1.38 | 1.8147 | 37.0 |
| 5 | −2.572 (ASP) | 0.93 | | |
| 6 | ∞ | 0.50 | 1.5168 | 64.2 |
| 7 | ∞ | 0.50 | | |
| 8 | IMG | | | |

In the second embodiment, both surfaces s1 and s2 of the first lens G1 and both surfaces s4 and s5 of the second lens G2 are each formed into an aspheric surface profile. Table 4 shows fourth, sixth, eighth, tenth, and twelfth aspheric surface coefficients A, B, C, D, and E of the respective surfaces s1, s2, s4, and s5, together with conic constants in the numeric embodiment 1.

TABLE 4

| Si | K | A | B | C | D | E |
|---|---|---|---|---|---|---|
| 1 | 0.2435 | −3.696E−03 | −1.116E−03 | 3.199E−04 | −1.589E−03 | 5.505E−04 |
| 2 | 2.2193 | 4.152E−02 | −1.595E−01 | 8.298E−01 | −91017E−01 | 1.251E+00 |
| 4 | 11.1125 | −2.103E−02 | −2.904E−02 | 7.333E−02 | −7.168E−02 | 2.431E−02 |
| 5 | 1.1614 | −4.913E−03 | −4.489E−03 | 6.292E−04 | 4.533E−04 | −1.552E−04 |

Figure 4:
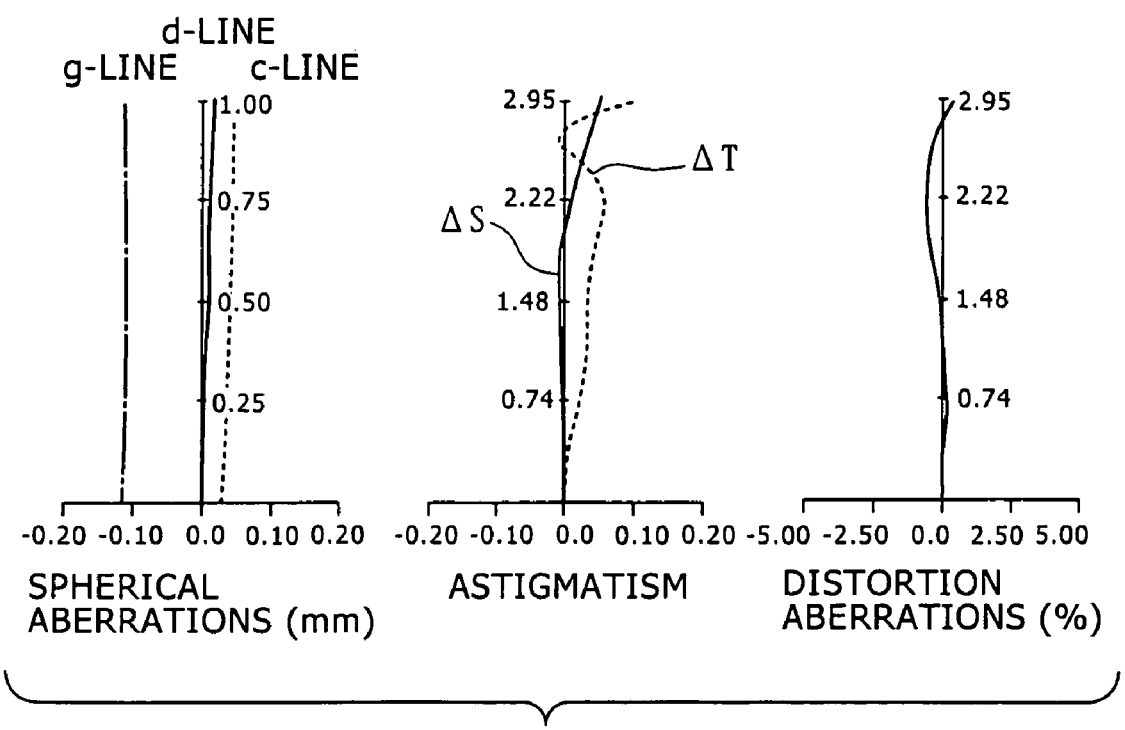
FIG. 4 shows diagrams of spherical aberrations, astigmatism, and distortion aberrations according to a numeric embodiment 2 wherein practical numeric values are applied to the second embodiment.

FIG. 4 shows diagrams of spherical aberrations, astigmatism, and distortion aberrations according to the numeric embodiment 2. In the diagrams of spherical aberrations, a solid line represents a spherical aberration at the d-line, a broken line represents a spherical aberration at the C-line, and a single-dotted chain line represents a spherical aberration at the g-line. In the diagram of astigmatism, a solid line shows a sagittal image plane, and a broken line a meridional image plane.

As can be seen from Table 3, according to the numeric embodiment 2, the total length is as short as 5.52 mm; and it can be known from FIG. 4 that the respective aberrations are appropriately corrected.

Third Embodiment

Figure 5:
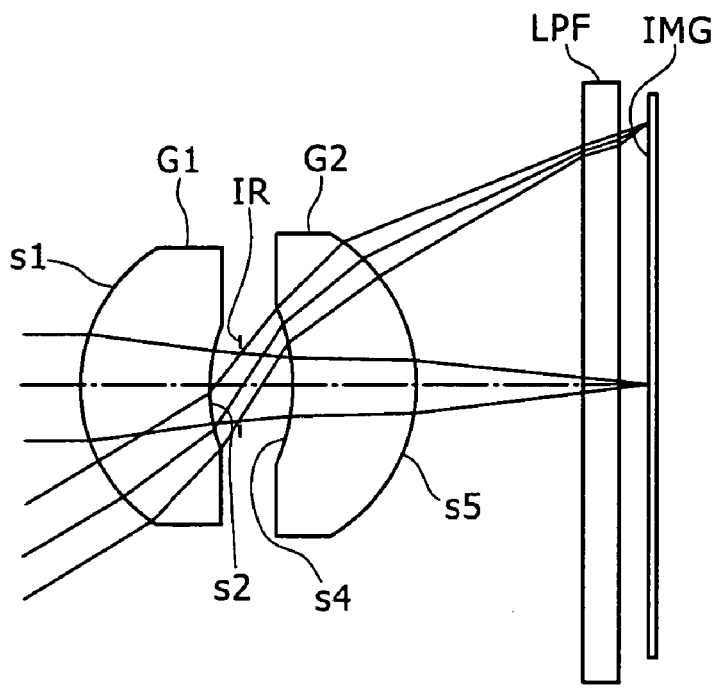
FIG. 5 is a view showing a lens configuration according to a third embodiment of the present invention.

FIG. 5 is a view of a lens configuration according to a third embodiment of the present invention. An imaging lens of the third embodiment is configured of a first lens G1, a second lens G2, and an aperture diaphragm IR that are arrayed in that order from the object side. The first lens G1 has a meniscus profile with a convex surface facing the object side and has a positive refractive index, and the second lens G2 has a meniscus profile with a convex surface facing the image side and has a positive refractive index. An "LPF" is a lowpass filter interposed between the second lens G2 and an imaging plane IMG.

Table 5 shows data of an optical system according to a numeric embodiment 3 in the case where practical numeric values are applied to the third embodiment.

TABLE 5

FNo = 4.0
f = 3.54
2ω = 62.69°

| Si | Ri | di | ni | υi |
|---|---|---|---|---|
| 1 | 1.389 (ASP) | 1.06 | 1.7433 | 49.3 |
| 2 | 1.507 (ASP) | 0.26 | | |
| 3 | Aperture | 0.40 | | |
| 4 | −2.353 (ASP) | 1.07 | 1.8061 | 40.7 |
| 5 | −1.611 (ASP) | 1.38 | | |
| 6 | ∞ | 0.30 | 1.5168 | 64.2 |
| 7 | ∞ | 0.30 | | |
| 8 | IMG | | | |

In the third embodiment, both surfaces s1 and s2 of the first lens G1 and both surfaces s4 and s5 of the second lens G2 are each formed into an aspheric surface profile. Table 6 shows fourth, sixth, eighth, tenth, and twelfth aspheric surface coefficients A, B, C, D, and E of the respective surfaces s1, s2, s4, and s5, together with conic constants in the numeric embodiment 3.

TABLE 6

| Si | K | A | B | C | D | E |
|---|---|---|---|---|---|---|
| 1 | 0.2614 | 2.011E−03 | −1.781E−02 | 3.317E−02 | −3.497E−02 | 1.767E−02 |
| 2 | 1.2722 | 9.800E−02 | −7.581E−01 | 4.679E+00 | −6.094E+00 | −1.715E+00 |
| 4 | −43.7624 | −5.598E−01 | 9.293E−01 | −2.301E+00 | 1.719E+00 | 9.491E−01 |
| 5 | 0.3811 | −3.200E−04 | −5.953E−02 | 4.746E−02 | −2.182E−02 | −2.975E−03 |

Figure 6:
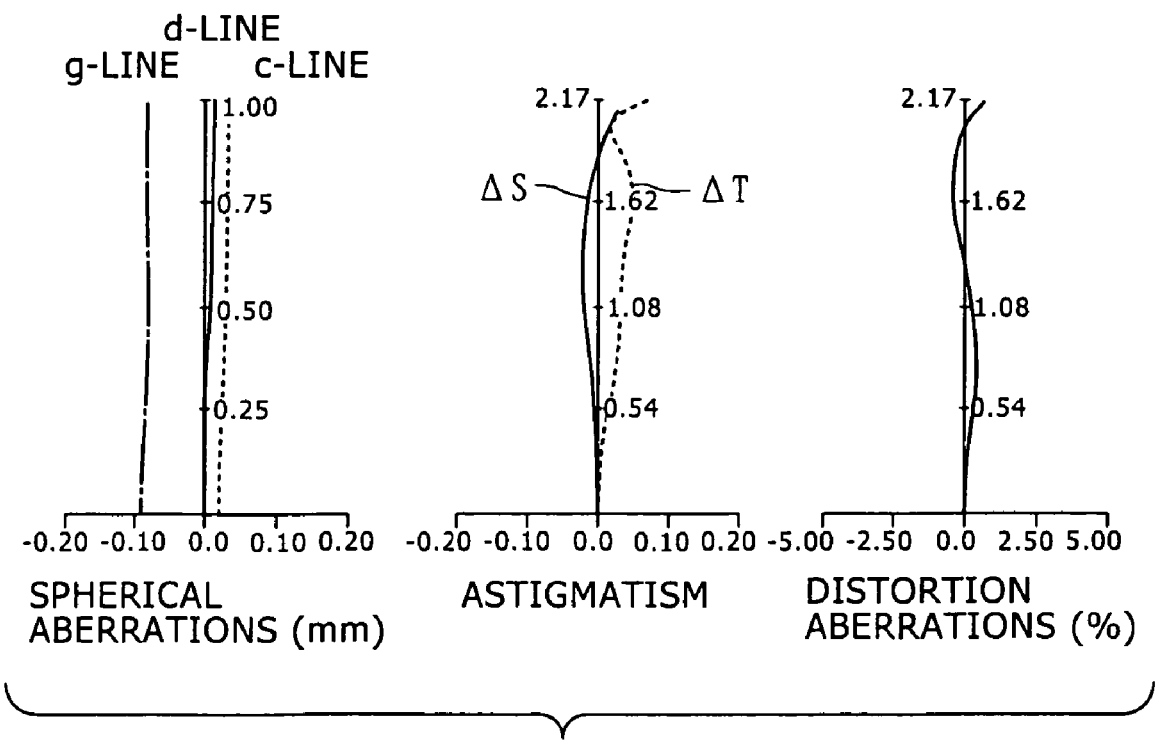
FIG. 6 shows diagrams of spherical aberrations, astigmatism, and distortion aberrations according to a numeric embodiment 3 wherein practical numeric values are applied to the third embodiment.

FIG. 6 shows diagrams of spherical aberrations, astigmatism, and distortion aberrations according to the numeric embodiment 3. In the diagrams of spherical aberrations, a solid line represents a spherical aberration at the d-line, a broken line represents a spherical aberration at the C-line, and a single-dotted chain line represents a spherical aberration at the g-line. In the diagram of astigmatism, a solid line shows a sagittal image plane, and a broken line a meridional image plane.

As can be seen from Table 5, according to the numeric embodiment 3, the total length is as short as 4.77 mm; and it can be known from FIG. 6 that the respective aberrations are appropriately corrected.

Fourth Embodiment

Figure 7:
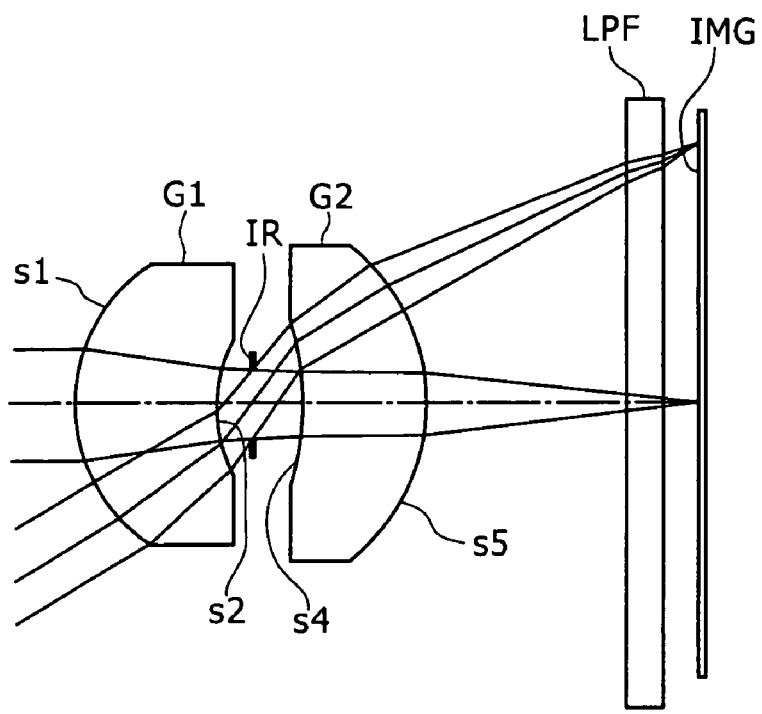
FIG. 7 is a view showing a lens configuration according to a fourth embodiment of the present invention.

FIG. 7 is a view of a lens configuration according to a fourth embodiment of the present invention. An imaging lens of the fourth embodiment is configured of a first lens G1, a second lens G2, and an aperture diaphragm IR that are arrayed in that order from the object side. The first lens G1 has a meniscus profile with a convex surface facing the object side and has a positive refractive index, and the second lens G2 has a meniscus profile with a convex surface facing the image side and has a positive refractive index. An "LPF" is a lowpass filter interposed between the second lens G2 and an imaging plane IMG.

Table 7 shows data of an optical system according to a numeric embodiment 4 in the case where practical numeric values are applied to the fourth embodiment.

TABLE 7

FNo = 4.0
f = 3.54
2ω = 62.60°

| Si | Ri | di | ni | υi |
|---|---|---|---|---|
| 1 | 1.387 (ASP) | 1.12 | 1.7886 | 37.5 |
| 2 | 1.088 (ASP) | 0.26 | | |
| 3 | Aperture | 0.40 | | |
| 4 | −3.696 (ASP) | 1.00 | 1.7924 | 35.9 |
| 5 | −1.533 (ASP) | 1.60 | | |
| 6 | ∞ | 0.30 | 1.5168 | 64.2 |
| 7 | ∞ | 0.30 | | |
| 8 | IMG | | | |

In the fourth embodiment, both surfaces s1 and s2 of the first lens G1 and both surfaces s4 and s5 of the second lens G2 are each formed into an aspheric surface profile. Table 8 shows fourth, sixth, eighth, tenth, and twelfth aspheric surface coefficients A, B, C, D, and E of the respective surfaces s1, s2, s4, and s5, together with conic constants in the numeric embodiment 4.

TABLE 8

| Si | K | A | B | C | D | E |
|---|---|---|---|---|---|---|
| 1 | 0.3531 | 5.904E−04 | −1.209E−02 | 2.648E−02 | −2.807E−02 | 1.165E−02 |
| 2 | 1.3899 | 9.254E−02 | 9.051E−02 | 6.415E−01 | 5.766E+00 | 9.444E−02 |

TABLE 8-continued

| Si | K | A | B | C | D | E |
|---|---|---|---|---|---|---|
| 4 | −126.4514 | −2.911E−01 | 7.974E−01 | −1.684E+00 | 2.285E+00 | −1.276E+00 |
| 5 | −0.2316 | −4.453E−03 | −3.902E−02 | 4.789E−02 | −4.177E−02 | 1.599E−02 |

Figure 8:
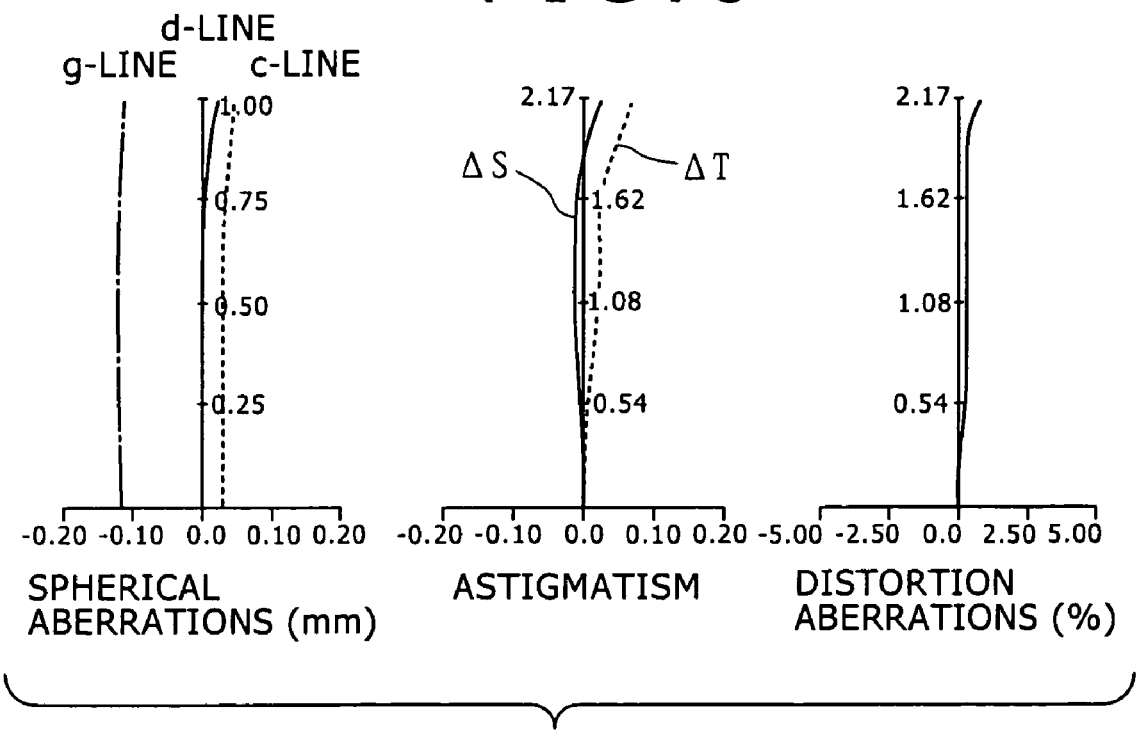
FIG. 8 shows diagrams of spherical aberrations, astigmatism, and distortion aberrations according to a numeric embodiment 4 wherein practical numeric values are applied to the fourth embodiment.

FIG. 8 shows diagrams of spherical aberrations, astigmatism, and distortion aberrations according to the numeric embodiment 4. In the diagrams of spherical aberrations, a solid line represents a spherical aberration at the d-line, a broken line represents a spherical aberration at the C-line, and a single-dotted chain line represents a spherical aberration at the g-line. In the diagram of astigmatism, a solid line shows a sagittal image plane, and a broken line a meridional image plane.

As can be seen from Table 7, according to the numeric embodiment 4, the total length is as short as 4.98 mm; and it can be known from FIG. 8 that the respective aberrations are appropriately corrected.

Table 9 shows numeric data of the conditional expressions (1) to (7) according to the respective numeric embodiments 1 to 4.

TABLE 9

| Conditional Expression | First Embodiment | Second Embodiment | Third Embodiment | Fourth Embodiment |
|---|---|---|---|---|
| (1) f/f1 | 0.83 | 0.87 | 0.72 | 0.36 |
| (2) L/f | 1.239 | 1.160 | 1.319 | 1.375 |
| (3) n(ave) | 1.79 | 1.78 | 1.77 | 1.79 |
| (4) d1/f | 0.073 | 0.065 | 0.074 | 0.073 |
| (5) d2/f | 0.117 | 0.152 | 0.113 | 0.113 |
| (6) θ1 | 67.6° | 74.1° | 61.0° | 66.7° |
| (7) θ2 | 70.3° | 77.5° | 62.1° | 45.8° |

Figure 9:
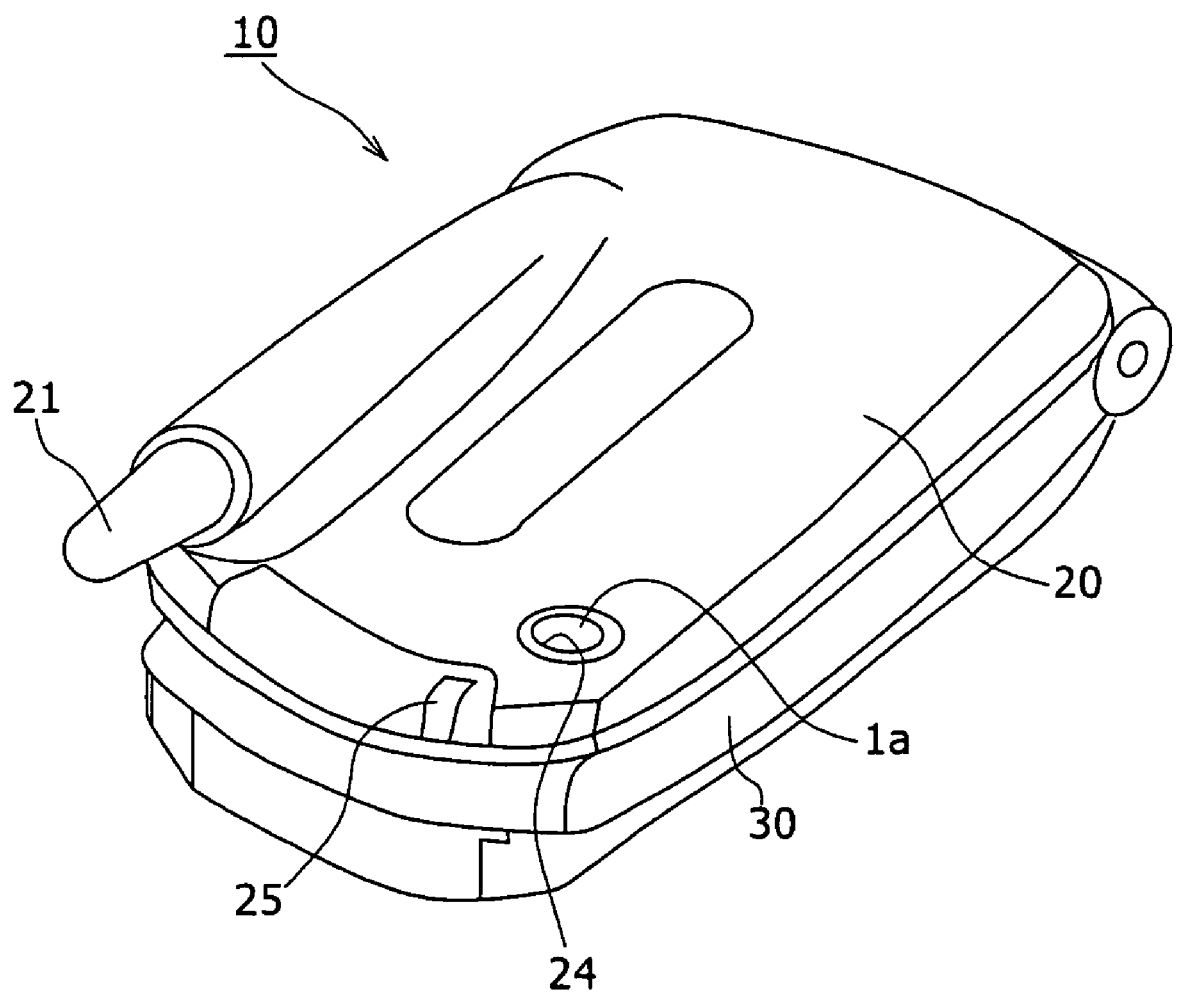
FIG. 9, together with FIGS. 10 to 11, shows an embodiment wherein a present inventive imaging apparatus is adapted to a mobile phone, and specifically.
Figure 10:
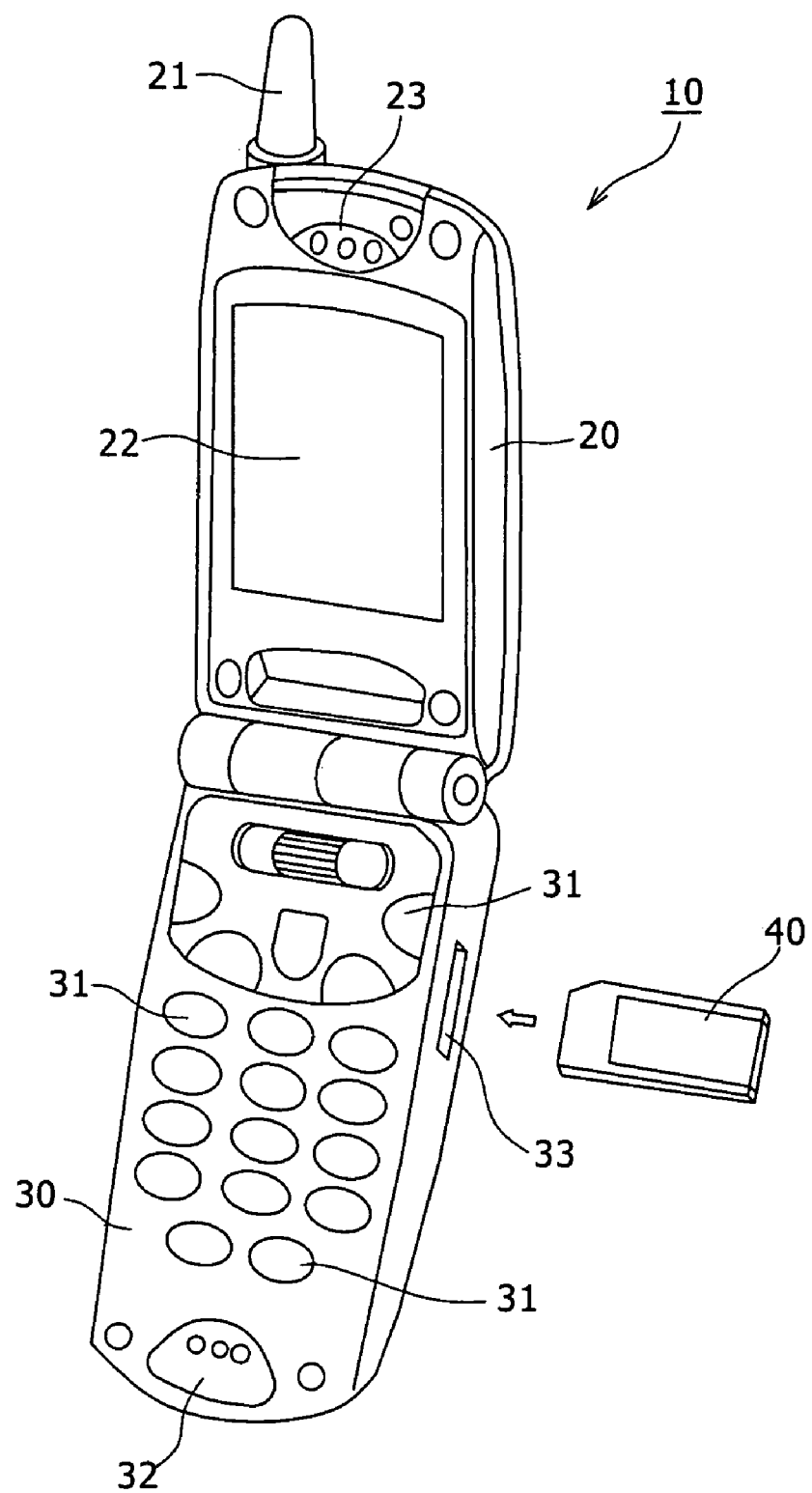
FIG. 10 is a perspective view showing a use state of the mobile phone.

FIGS. 9 to 11 refer to an embodiment of an imaging apparatus using any one of the imaging lenses. The shown embodiment is a mobile phone 10 containing a digital camera, to which the invention is adapted.

FIGS. 9 and 10 depict exteriors of a mobile phone 10.

The mobile phone 10 is configured such that a display section 20 and a main body section 30 are connected to be foldable from a central hinge portion. In a carrying event, the mobile phone 10 is put into a folded state where the display section 20 and the main body section 30 are put into a folded state in a carrying event, as shown in FIG. 10, whereas in a using event such as a call event, the mobile phone 10 is put into an open state where the display section 20 and the main body section 30 are open, as shown in FIG. 9.

An antenna 21 for radio wave transmission/reception communication with a base station is extendably and retractably provided in a position near one side portion on a rear wall side of the display section 20. In addition, a liquid crystal display (LCD) panel 22 is disposed on an inner surface of the display section 20. The LCD panel 22 has a size occupying substantially the entirety of the inner surface, and a speaker 23 is disposed above the LCD panel 22. Further, an imaging unit 1 of the digital camera is disposed in the display section 20, wherein an imaging lens 1a of the imaging unit 1 is formed on the back surface of the display section 20 in such a manner as to see outwardly through the see-through opening 24. The term "imaging unit" is used to refer to a unit that is configured of the imaging lens 1a and an imaging device 1b. More specifically, while the imaging lens 1a and the imaging device 1b should be provided concurrently in the display section 20, other digital-camera components, such as a camera control section and a recording medium, may be disposed in the main body section 30. The term "imaging unit" is used to clarify this concept.

In addition, an infrared communication section 25 is disposed in an end portion of the display section 20, and an infrared light emitting device (not shown) and an infrared light photoreceptor device (not shown) are provided in the infrared communication section 25.

Operation keys 31 (31, 31 . . . ), such as "0" to "9" numeric keys, a call key, and a power on/off key(s), are provided to an inner surface of the main body section 30, and a microphone 32 is disposed below the portion where the operation keys 31. In addition, a memory card slot 33 is provided to a sidewall of the main body section 30, wherein a memory card 40 can be inserted into and removed from the main body section 30 through the memory card slot 33.

FIG. 11 is a block diagram depicting the configuration of the mobile phone 10.

The mobile phone 10 has a CPU 50 (central processing unit) that controls the total operation of the mobile phone 10. More specifically, the CPU 50 expands control programs stored in a ROM 51 (read only memory) into a RAM 52 (random access memory), thereby to control the operation of the mobile phone 10 through a bus 53.

A camera control section 60 controls the imaging unit 1, which is configured of the imaging lens 1a and the imaging device 1b, thereby to capture still images and motion, wherein acquired image information is, for example, compressed into, for example, a JPEG or MPEG format, and is then carried on the bus 53. The image information carried on the bus 53 is temporarily stored in the RAM 52, and output to a memory card interface 41 by necessity. The image information is, for example, stored into the memory card 40 through the memory card interface 41, or displayed on the LCD panel 22 through a display control section 54. In addition, audio information synchronously recorded in the image capture event through the microphone 32 is, for example, temporarily stored together with the image information into the RAM 52 or through an audio codec (compressor/decompressor) 70 or stored into the memory card 40. The audio information is output from the speaker 23 through the audio codec 70 in synchronism with image display on the LCD panel 22. Further, information such as image information and audio information are, by necessity, output to an infrared light interface 55. The information are then output by the infrared light interface 55 to the outside through the infrared communication section 25, and are then transmitted to external information devices having a similar infrared communication section, such as mobile phones, personal computers, PDAs (personal digital assistances). Suppose that a motion image or still image is to be displayed on the LCD panel 22 in accordance with image information stored in a medium such as the RAM 52 or memory card 40. In this case, in the camera control section 60, a corresponding file stored in a medium such as the RAM 52 or memory card 40 is, for example, decoded and decompressed, and then image data is sent to the display control section 54.

A communication control section 80 performs radio wave transmission/reception communication with the base station through the antenna 21. In an audio communication mode, the communication control section 80 processes received audio information and then outputs the processed audio information to the speaker 23 through the audio codec 70. In addition, the communication control section 80 receives audio collected in the microphone 32 through the audio codec 70, performs a predetermined process thereon, and then sends the audio.

The imaging lens 1a can thus be configured with the short depth, so that the imaging lens 1a can easily be mounted to a thickness-constrained apparatus or device, such as the mobile phone 10. The embodiment has demonstrated the example of the present inventive imaging apparatus is adapted to the mobile phone, however, the present inventive imaging apparatus can of course be adapted to other information devices, such as a personal computer and a PDA. The present inventive imaging apparatus produces significant advantages in adaptation to those information devices.

The specific matters, such as configurations, profiles, and numeric values, described and shown in the respective embodiments and the numeric embodiments are only examples for use in carrying out the present invention, hence the specific matters should not be construed as limiting the technical scope of the invention.

As industrial applicability and feasibility of the invention, since the invention is compact, specifically short in the total length, and has high performance, it is suitable for the use of acquiring images in, for example, compact information devices, mobile phones, PDAs, and personal computers.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging lens system, comprising:

a first lens having a meniscus profile with a convex surface facing an object side an aperture diaphragm; and a second lens having a meniscus profile with a convex surface facing an image side wherein the first lens, the aperture diaphragm, and the second lens are arranged in this order from the object side; and the imaging lens satisfies conditional expressions (1), (2), and (3):

$$0.2 < f/f1 < 1.0; \tag{1}$$

$$1.05 < L/f < 1.38; \text{ and} \tag{2}$$

$$n(ave) > 1.7, \tag{3}$$

where, f represents the total focal distance of the total imaging lens system;

f1 represents a focal distance of the first lens; and

L represents a distance on the optical axis from the surface on the object side of the first lens to an image plane; and n(ave) represents an average value of refractive indexes at d-lines of the first and second lenses, and further satisfying conditional expressions (4) and (5):

$$0.05 \leq d1/f \leq 0.09; \text{ and} \tag{4}$$

$$0.10 \leq d2/f \leq 0.18, \tag{5}$$

where, f represents the focal distance of the total lens system;

d1 represents a distance from a surface on the image side of the first lens to the aperture diaphragm; and d2 represents a distance from the aperture diaphragm to a surface on the object side of the second lens.

2. An imaging lens system according to claim 1, wherein at least the surface on the object side of the first lens and the surface on the image side of the second lens are each formed into an aspheric surface profile.

3. An imaging lens system according to claim 2, wherein the surface on the object side of the first lens satisfies a conditional expression (6):

$$55° < |\theta1(h)| < 80° \tag{6}$$

where,

θ1(h) represents a tilt of the surface on the object side of the first lens at a height h(=D1/2), D1 representing an effective diameter of the surface on the object side of the first lens.

4. An imaging lens system according to claim 2, wherein the surface on the image side of the second lens satisfies a conditional expression (7):

$$55° < |\theta2(h)| < 80°, \tag{7}$$

where,

θ2(h) represents a tilt of the surface on the image side of the second lens at the height h(=D2/2), D2 representing an effective diameter of the surface on the image side of the second lens.

5. An imaging apparatus lens system comprising:

an imaging lens that includes a first lens having a meniscus profile with a convex surface facing an object side, an aperture diaphragm, and a second lens having a meniscus profile with a convex surface facing an image side, wherein the first lens, the aperture diaphragm, and the second lens are arranged in this order from the object side; and an imaging device that converts into a signal an optical image formed by the imaging lens, wherein the imaging lens satisfies conditional expressions (1), (2), and (3):

$$0.2 < f/f1 < 1.0; \tag{1}$$

$$1.05 < L/f < 1.38; \text{ and} \tag{2}$$

$$n(ave) > 1.7, \tag{3}$$

where, f represents the total focal distance of the total imaging apparatus lens system;

f1 represents a focal distance of the first lens; and

L represents a distance on the optical axis from the surface on the object side of the first lens to an image plane; and n(ave) represents an average value of refractive indexes at d-lines of the first and second lenses, wherein the imaging lens further satisfies conditional expressions (4) and (5):

$$0.05 \leq d1/f \leq 0.09; \text{ and} \tag{4}$$

$$0.10 \leq d2/f \leq 0.18. \text{ where,} \tag{5}$$

f represents the focal distance of the total lens system;

d1 represents a distance from a surface on the image side of the first lens to the aperture diaphragm; and d2 represents a distance from the aperture diaphragm to a surface on the object side of the second lens.

6. An imaging apparatus lens system according to claim 5, wherein at least the surface on the object side of the first lens and the surface on the image side of the second lens are each formed into an aspheric surface profile.

7. An imaging apparatus lens system according to claim 5, wherein the surface on the object side of the first lens satisfies a conditional expression (6):

$$55° < |\theta 1(h)| < 80° \tag{6}$$

where, $\theta 1(h)$ represents a tilt of the surface on the object side of the first lens at a height $h(=D1/2)$, D1 representing an effective diameter of the surface on the object side of the first lens.

8. An imaging apparatus lens system according to claim 6, wherein the surface on the image side of the second lens satisfies a conditional expression (7):

$$55° < |\theta 2(h)| < 80°, \tag{7}$$

where, $\theta 2(h)$ represents a tilt of the surface on the image side of the second lens at the height $h(=D2/2)$, D2 representing an effective diameter of the surface on the image side of the second lens.

9. An imaging lens system comprising:

a first lens having a meniscus profile with a convex surface facing an object side an aperture diaphragm; and a second lens having a meniscus profile with a convex surface facing an image side wherein the first lens, the aperture diaphragm, and the second lens are arranged in this order from the object side; and the imaging lens satisfies conditional expressions (1), (2), and (3):

$$0.2 < f/f1 < 1.0; \tag{1}$$

$$1.05 < L/f < 1.38; \text{ and} \tag{2}$$

$$n(ave) > 1.7, \tag{3}$$

where, f represents a focal distance of the total lens system;

f1 represents a focal distance of the first lens; and

L represents a distance on the optical axis from the surface on the object side of the first lens to an image plane; and n(ave) represents an average value of refractive indexes at d-lines of the first and second lenses, wherein at least the surface on the object side of the first lens and the surface on the image side of the second lens are each formed into an aspheric surface profile wherein at least the surface on the object side of the first lens and the surface on the image side of the second lens are each formed into an aspheric surface profile, and wherein the surface on the object side of the first lens satisfies a conditional expression (6):

$$55° < |\theta 1(h)| < 80° \tag{6}$$

where, $\theta 1(h)$ represents a tilt of the surface on the object side of the first lens at a height $h(=D1/2)$, D1 representing an effective diameter of the surface on the object side of the first lens.

10. An imaging apparatus lens system according to claim 9, wherein the surface on the image side of the second lens satisfies a conditional expression (7):

$$55° < |\theta 2(h)| < 80°, \tag{7}$$

where, $\theta 2(h)$ represents a tilt of the surface on the image side of the second lens at the height $h(=D2/2)$, D2 representing an effective diameter of the surface on the image side of the second lens.

11. An imaging apparatus lens system comprising:

an imaging lens that includes a first lens having a meniscus profile with a convex surface facing an object side, an aperture diaphragm, and a second lens having a meniscus profile with a convex surface facing an image side, wherein the first lens, the aperture diaphragm, and the second lens are arranged in this order from the object side; and an imaging device that converts into a signal an optical image formed by the imaging lens, wherein the imaging lens satisfies conditional expressions (1), (2), and (3):

$$0.2 < f/f1 < 1.0; \tag{1}$$

$$1.05 < L/f < 1.38; \text{ and} \tag{2}$$

$$n(ave) > 1.7, \tag{3}$$

where, f represents a focal distance of the total lens system;

f1 represents a focal distance of the first lens; and

L represents a distance on the optical axis from the surface on the object side of the first lens to an image plane; and n(ave) represents an average value of refractive indexes at d-lines of the first and second lenses, wherein at least the surface on the object side of the first lens and the surface on the image side of the second lens are each formed into an aspheric surface profile, and wherein the surface on the object side of the first lens satisfies a conditional expression (6):

$$55° < |\theta 1(h)| < 80° \tag{6}$$

where, $\theta 1(h)$ represents a tilt of the surface on the object side of the first lens at a height $h(=D1/2)$, D1 representing an effective diameter of the surface on the object side of the first lens.

12. An imaging apparatus lens system according to claim 11, wherein the surface on the image side of the second lens satisfies a conditional expression (7):

$$55° < |\theta 2(h)| < 80°, \tag{7}$$

where, $\theta 2(h)$ represents a tilt of the surface on the image side of the second lens at the height $h(=D2/2)$, D2 representing an effective diameter of the surface on the image side of the second lens.

* * * * *